United States Patent [19]
Stoddard

[11] 3,865,722
[45] Feb. 11, 1975

[54] CORONA DISCHARGE TREATMENT OF AN OIL SLICK

[76] Inventor: Patrick C. Stoddard, 7734 Leonard Dr., Falls Church, Va. 22043

[22] Filed: Oct. 25, 1972

[21] Appl. No.: 300,520

[52] U.S. Cl............... 210/42, 210/65, 210/DIG.21, 204/185
[51] Int. Cl............................................. C02b 9/02
[58] Field of Search............ 210/DIG. 21, 242, 243, 210/42, 65; 317/3, 4.262 R; 204/185, 188, 191, 302, 304, 305; 219/121 R

[56] References Cited
UNITED STATES PATENTS

| | | | |
|---|---|---|---|
| 3,074,870 | 1/1963 | Carswell et al. | 204/188 |
| 3,578,171 | 5/1971 | Usher | 210/242 |

*Primary Examiner*—Thomas G. Wyse
*Assistant Examiner*—Benoit Castel

[57] ABSTRACT

By subjecting an oil slick freely floating on a water surface to the action of a corona discharge, the oil tends to conglomerate and become cohesive. As a result, removal of the oil from the water surface is facilitated.

7 Claims, 5 Drawing Figures

CORONA DISCHARGE TREATMENT OF AN OIL SLICK

BACKGROUND OF THE INVENTION

The present invention relates to a method useful for removing oil slicks floating on the surfaces of oceans, lakes, rivers, and other bodies of water.

The pollution of open waters by crude oil and other petroleum products, hereinafter referred to as "oil," constitutes an ever-growing environmental problem. For example, in the United States alone as much as 8 million gallons or more of various types of oil are dumped, spilled, leaked or otherwise transferred to the inland and coastal water ways each year. Generally, oil so deposited forms a thin, generally continuous layer or "slick" which floats on the water surface. Such slicks usually move through natural currents to contiguous land areas where it deposits usually in the form of an ugly black scum.

In an effort to combat the oil spill problem, a number of processes and systems have been developed in the past. However, as is well known, none of these processes or systems are particularly effective. Consequently, there still exists a strong need for a simple, quick, inexpensive and effective method for removing oil slicks from water bodies.

Accordingly, it is an object of the present invention to provide a method for facilitating the removal of crude oil and other petroleum products floating on the surfaces of water bodies.

It is a further object of this invention to provide a method for removing oil slicks from water bodies which is simple to carry out hence easily accomplished by non-skilled personnel.

It is a still further object of this invention to provide a method for facilitating the removal of oil from the surfaces of water bodies which is capable of being brought into action very quickly after the original oil pollution has occurred so that significant spreading of the oil spill is eliminated.

SUMMARY OF THE INVENTION

These and other objects are accomplished according to the present invention which is based on the discovery that by subjecting an oil slick floating on the surface of a body of water to a high voltage corona discharge, the oil tends to become cohesive and the oil slick tends to stop spreading and may even conglomerate. Because of this phenomenon, the oil can be removed from the water surface far easier than possible in the past.

Accordingly, the present invention contemplates a process in which an oil slick floating on a water surface is subjected to a high voltage corona discharge for a time sufficient to effect a change in its physical properties. The oil is then allowed to congeal and preferably conglomerate after which it is removed from the water surface by conventional techniques such as, for example, with the aid of a surface suction pump.

Because the oil becomes cohesive and tends to conglomerate when subjected to the corona, it is far easier to handle during removal operations. Consequently, prior art removal techniques, such as pumping the oil off the water surface with a surface suction pump, can be accomplished more easily, efficiently and effectively. In addition, because of its unusual properties when subjected to a corona, the oil is far less likely to become emulsified in the water on which it floats during turbulent surface conditions. This also makes clean-up operations much simplier since the volume of liquid that must be removed from the water surface is kept to a minimum.

BRIEF DESCRIPTION OF THE DRAWINGS

The present invention may be more readily understood from the following drawings wherein.

DETAILED DESCRIPTION

Figure 1:
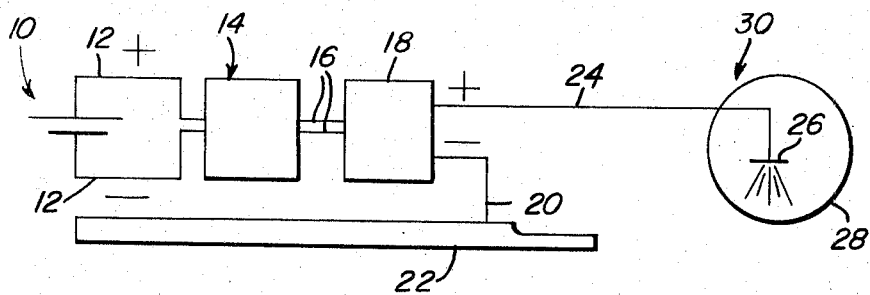
FIG. 1 is a schematic representation of the electrical circuit employed to generate the corona discharge used in the inventive process.

In accordance with the present invention, an oil slick freely floating on the surface of a body of water is subjected to a corona discharge, which as known in the art is the ionization of the gas surrounding an electrical lead raised to a high electrical potential. Because of this treatment, the physical properties of the oil change such that the oil in the slick tends to become cohesive and the slick itself not only stops spreading but may even conglomerate. Because the corona treated oil has these new properties, it is far easier to remove from the water surface than untreated oil.

When carrying out the oil treating process according to the present invention, the oil slick is simply subjected to a high voltage corona discharge. This can be easily accomplished by simply positioning a corona generating electrical lead, which as known simply consists of a pointed electrical conductor, a short distance above the water surface and charging the electrical lead with a high electrical voltage compared with the potenital of the water surface. In this regard, the particular voltage supplied to the electrical conductor employed in the present invention must be sufficient to generate enough corona to reach the oil slick. The voltage employed may, however, be higher then this, there being no upper limit aside from practical considerations to the voltage that can be employed.

The application of corona discharge to an oil slick, as indicated above, causes the oil to become cohesive and the oil slick to stop spreading or even to conglomerate. While not wishing to be bound to any theory, it is believed that the application of the corona discharge imparts an electrical charge to the oil surface being treated without significantly changing the electrical potential of the oil surface in contact with the water. This in effect causes the oil layer to be charged much in the same way as a capacitor, and this capacitance effect, in turn, causes the surface tension of the freely floating oil to markedly increase. As a result, instead of forming a thinner and thinner layer covering a larger and larger area, the oil tends to draw itself together into a more compacted mass. In addition, as a further result of increased surface tension, the floating oil refrains from becoming emulsified in the water on which it floats. And, in fact, with a sufficiently great amount of treatment an already formed water/oil emulsion can be broken up. Consequently, the spreading of oil in the form of a water oil emulsion is completely elimintaed.

The intensity and length of the corona treatment carried out according to the present invention may vary greatly. In this regard, it has been found that the magnitude of the conglomerating effect and the cohesive property imparted to an oil slick by a corona discharge are functins of both the applied voltage and the length of application. Thus, when carrying out the inventive process a higher voltage or a longer treatment time or both, tends to cause the oil to conglomerate faster and into a more highly compacted mass. In addition, when compacted, the oil mass is more cohesive. In any event, regardless of the voltage and time of application, the conglomerating effect and cohesive property imparted to the oil slick passes to the entire body of the oil slick very quickly. Consequently, the thinning and spreading of an oil slick so treated is slowed and may even be reversed almost immediately as the corona treatment is initiated.

Once the oil has sufficiently conglomerated by the action of the corona discharge, the oil can be removed from the water surface. In this regard it should be appreciated that the oil clean-up operation can be begun immediately after, or even at the same time as, the corona treatment is initiated. However, as indicated above, the magnitude of the changes in the properties of the oil slick as a result of the corona becomes more pronounced as the intensity and length of treatment increase. Accordingly, even a minimal corona treatment will facilitate the clean up of an oil slick, although a longer and more intense treatment will facilitate oil clean up more.

Removal of the oil from the water surface can be accomplished by any means known in the art. In this regard, it has been found that the unusual properties imparted to the oil by the corona treatment substantially vanish as soon as the oil is removed from the water surface, a phenomenon believed to be due to the decharging of the electrically charged oil. Accordingly, the particular oil clean-up method employed is preferably one which entraps the oil at the same time it separates the oil from the water surface, such as for example pumping the oil from the water surface with a surface suction orifice. In any event, the treated oil remaining on the water surface, as well as any oil falling from the clean-up apparatus back into the treated oil, retain their unusual corona-imparted properties so long as they are not separated from the water surface. Thus, even clean-up methods which draw the oil off the water surface before the oil and water are separated can be used, although handling of the oil drawn off the water surface will be somewhat more difficult.

When the oil has been removed from the water, it still may be somewhat cohesive in nature. If so it can be discarded if desired. Alternatively, and preferably, the cohesive oil can be reclaimed for reuse by simply forcing it through a fine filter, such as a fine metal screen having for example aperture sizes of about 1 square millimeter. Surprisingly, by forcing it through the filter, the oil looses its residual cohesiveness and its tendency to conglomerate, a phenomenon believed to be due to the fact that the oil is completely decharged when it passes through such a metal screen.

In order to subject an oil slick to a corona discharge in accordance with the present invention, apparatus as illustrated in the Figures can be employed. Referring to FIG. 1, the electrical circuit of a typical corona discharge apparatus useful in the present invention takes the following form. A power source 10 such as a 12 volt battery is electrically connected by means of leads 12 to a power converter 14 for converting the 12 volt direct current produced by the battery to 120 volt A. C. — 60 cycle per second current. Electrical leads 16 connect power converter 14 to a main power supply 18 capable of producing an extremely high voltage-low amperage current, for example, 75 kilovolts–1.5 milliamps, from the converter current. The battery 12, power converter 14, and main power supply 18 are all conventional in the art and readily available.

The negative lead of the main power supply 18 is attached by means of electrical lead 20 to chassis 22 on which battery 12, power converter 14 and main power 18 are secured. Connected to the positive lead of main power supply 18 is an electrical lead 24 which is attached at its outer end to corona discharge generator 24. Surrounding the corona discharge generator 26 is a protective cover 28 which is provided to prevent surface waves from shorting out corona discharge generator 26. Corona discharge generator 26 and protective cover 28 are so made that corona discharge generator 26 will always be positioned a few inches, for example 6, above and be directed at the water surface. With this construction, corona discharge generator 26, will generate and direct corona discharges at the oil slick above which it is positioned with little or no shorting due to water turbulance.

Figure 2:
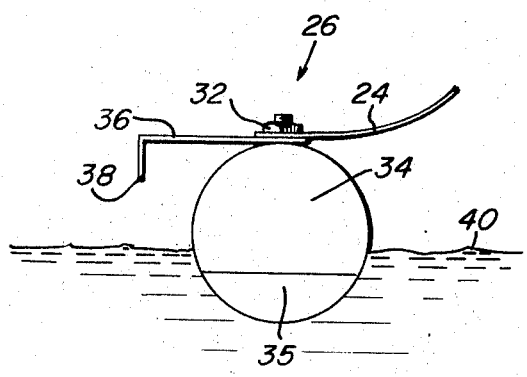
FIG. 2 is a schematic representation of an exemplary corona generating element employed in the apparatus according to the present invention.

A particular construction which may be employed for the corona discharge generator 26 is illustrated in FIG. 2. As shown, electrical lead 24 leading from the positive current terminal of main power supply 18 is electrically connected to a terminal 32 on a float 34. Float 34 is composed of a hollow piece of plastic and is adapted by means of ballast 35 to float on the oil slick-water surface in a stable position. Electrically connected to terminal 32 is a conducting arm 36 having a pointed end 38 directed at the liquid surface 40 on which the device floats. If desired, a protected cover (not shown) can be provided to insulate the terminal 32 from any water that may inadvertently be splashed onto the top of the device.

Figure 3:
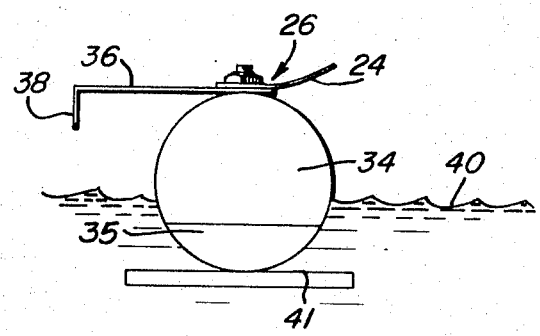
FIG. 3 is a schematic view similar to FIG. 2 showing another corona generating element useful in the present invention.

Another embodiment of a corona discharge generaor 26 useful in the present invention is illustrated in FIG. 3. This corona discharge generator is constructed in the same way as the corona discharge generator shown in FIG. 2 except that the corona discharge generator of FIG. 3 includes a metallic conductor 41. As shown, metallic conductor 41 is positioned on the bottom of float 34 and is adapted to rest in the water underneath the oil slick when the generator is in use. In addition, the metallic conductor is preferably electrically connected to the chassis 22 of the inventive apparatus. A corona generator of this construction facilitates the production of corona discharges especially when the available voltage is not very high. Accordingly, in these situations, a corona generator equipped with metallic conductor 41 is preferably used.

Figure 4:
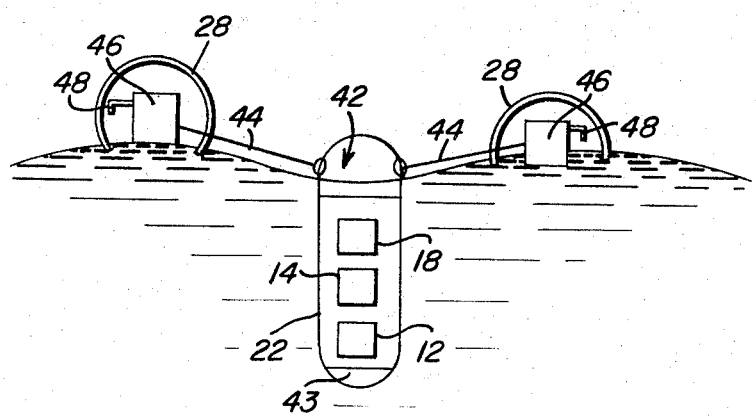
FIG. 4 is a schematic view of a free floating apparatus according to the present invention for subjecting an oil slick to a corona discharge.

The actual construction of an apparatus system according to the present invention will vary depending on exactly how the inventive apparatus is used. For example, FIG. 4 illustrates apparatus according to the present invention adapted to be employed as a free floating device located directly in the midst of an oil slick. As shown in this figure, battery 12, power converter 14, and main power supply 18 are all housed in a common chassis 22. In addition, chassis 22 is provided with a floation chamber 42 and ballast 43 to provide the proper floation characteristics to the entire chassis assembly.

Attached to an upper part of chassis 22 are corona arms 44, each of which carries an electrical lead (not shown) leading from the positive terminal of main power supply 18. The other ends of corona arms 44 are attached to floats 46, each of which carries a pointed electrical conductor 48 for generating corona discharges. Finally, each of the floats 46 and pointed electrical conductor 48 assemblies are housed in a protective covering 28 for preventing shortage through the turbulence of the water in which each assembly floats.

In a preferred embodiment of the invention, the inventive apparatus as illustrated in FIG. 4 is further provided with control means adapted to actuate the electrical circuit as soon as the apparatus is properly positioned in the water. With this construction, the inventive apparatus will operate completely automatically, no operating personnel being necessary. Accordingly, the inventive apparatus when so equipped can be dropped by a passing airplane or ship directly into an oil slick far removed from oil clean-up equipment and personnel so that corona treatment can be initiated long before the clean-up operation would otherwise be able to start.

Figure 5:
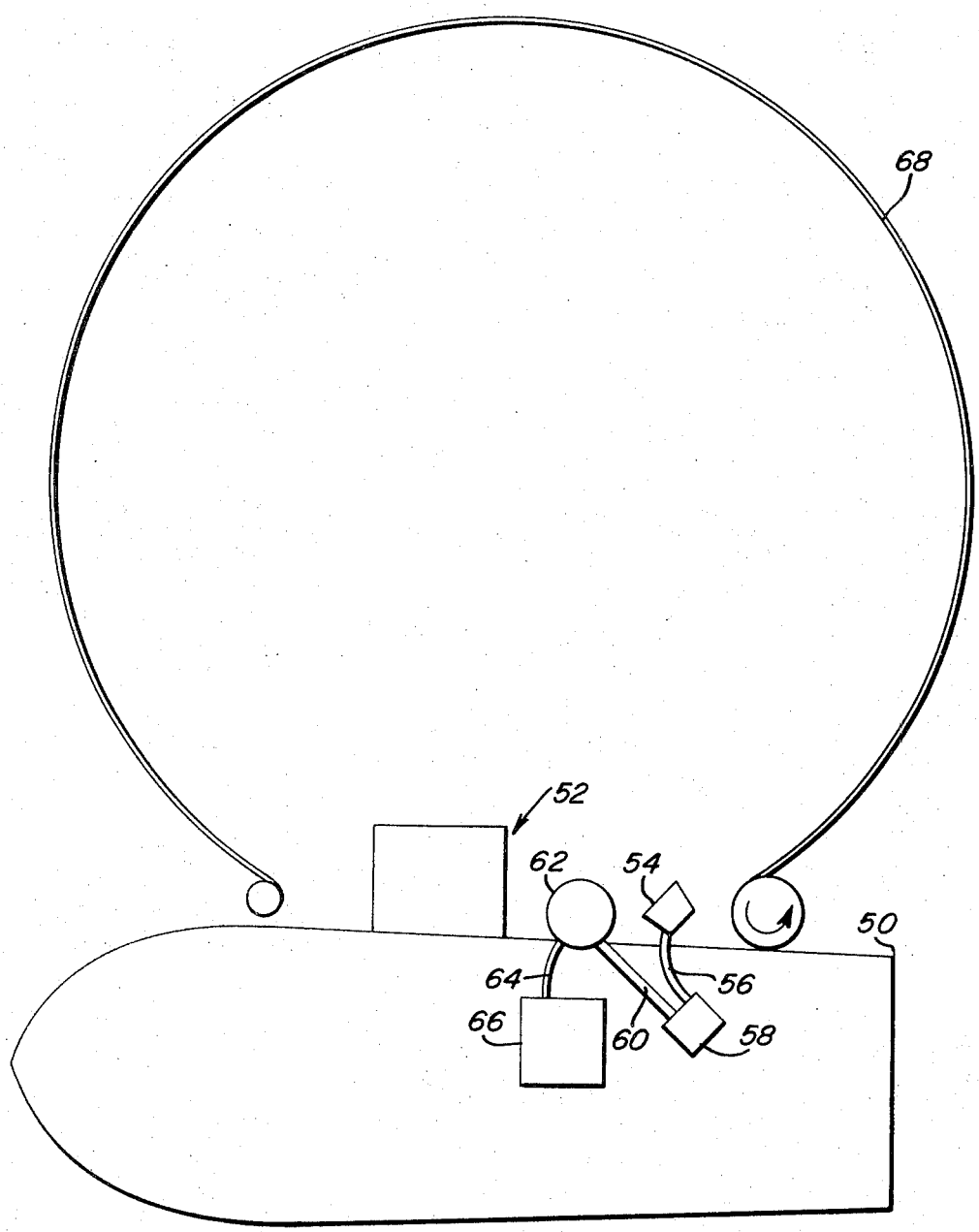
FIG. 5 is a schematic representation of an oil slick clean-up operation carrying out inventive process and employing the inventive apparatus.

Still another method for employing the inventive apparatus is illustrated in FIG. 5. As shown in this figure, a ship 50 carries the inventive oil slick treating apparatus 52, the corona generator of the inventive device being movable to within a few inches of the oil slick surface. Located on the same side of the ship as the inventive apparatus 52 is a surface suction inlet 54 which is connected by means of conduit 56 to a pump 58. The outlet of pump 58 is transferred by means of conduit 60 to a filter 62 and from there by means of conduit 64 to oil reservoir 66. The ship is also provided with a mechanical fence 68 for surrounding the oil during the clean-up process.

In operation, the ship when arriving on the scene of the oil slick position itself so that the inventive oil treating apparatus can subject the slick to a corona discharge. The inventive apparatus is then allowed to operate so that the oil in the slick becomes cohesive and the slick stops spreading and preferably begins to conglomerate. When the oil has been subjected to the desired amount of treatment or immediately if desired, pump 58 is started so that the oil is drawn from the water surface through surface suction inlet 54, conduit 56, pump 58 and conduit 60 into filter 62. As the conglomerated and cohesive oil passes through filter 62, it changes back to its original consistency and state. Accordingly, the oil filtrate which is passed through conduit 64 into oil reservoir 66 is now reclaimed for use and can be used just as if it had never been spilled.

During the pick-up operation, the area of water covered by the oil slick decreases. When this area becomes sufficiently small, mechanical fence 68 can be extended in a conventional manner to surround the oil slick and prevent it from moving with respect to ship 50. In addition, as the slick grows still smaller and smaller in area, mechanical fence 68 can be reeled in so that the slick will always be in active communication with the inventive oil treating unit 52 and the inlet suction orifices 54.

A few of the advantages of the inventive oil slick treating system are as follows:

1. The treatment of oil slicks with corona discharges makes oil clean-up operations significantly easier since it makes the oil far more bulky and manageable than if it were in its natural state.

2. The inventive system is comparatively inexpensive to operate, because the parts employed in the inventive system are readily available in the art. Moreover, because the oil slick which has been electrically charged through the action of the corona retains substantially all its charge for long periods of time, the power requirements of the inventive system are quite small.

3. Because of its simple design and its self-contained nature, the inventive apparatus can be air lifted to the site of an oil spill in a minimum amount of time. This represents a great advantage especially when clean-up equipment capable of removing the oil slick is located a great distance away from the slick. In these situations, the inventive apparatus can be deployed in a minimum amount of time for preventing the spread of the oil to cover larger and larger areas. When the clean-up equipment finally arrives, the oil will not only be in a far more convenient state for the clean-up operation, but will also occupy a much smaller area than had the oil been free to thin out as it would in its natural state.

4. Because the oil when treated with a corona discharge according to the present invention retains substantially all of its charge with time, the conglomerating affect and cohesive properties imparted to the slick will be retained by the slick for comparatively long periods of time. Accordingly, when necessary, the slick after being treated according to the present invention, can be left alone without further treatment for a comparatively long period of time so that the clean-up operation can be accomplished when more convenient.

Although only a few embodiments of the present invention have been described and illustrated in the above specification, it should be understood that many modifications can be made without departing from the spirit and scope of the invention. For example, it should be appreciated that any type of power source can be employed to generate the power necessary to create a corona discharge. Moreover, either a positive corona or a negative corona can be employed to act on the floating oil. In addition, it should be appreciated that an oil slick can be treated with any amount of corona according to the present invention since the beneficial effects of the corona treatment will be realized regardless of the extent of the treatment. Moreover, the corona treatment can be carried out to completion before the start of the clean-up operation, or if desired, the corona treatment can continue until the clean-up operation is complete.

It should also be realized that the type of corona generator employed in the inventive apparatus can be varied at will so long as at least some corona discharge reaches oil slick surface. Moreover, the protective covering 28 shown in the figures to cover the corona generator 26 only can be made to cover the entire inventive apparatus instead if desired.

It should also be understood that the inventive apparatus may be deployed in many different ways than those specifically described in the above specification.

For example, the inventive apparatus can be anchored with respect to the bottom of the water body so that it will be stationary rather than free floating. Alternatively, the inventive apparatus can be provided with means to insure that it always remains in contact with the oil slick regardless of its direction of travel. Also, the inventive apparatus can be employed on shore so long as the corona generating means is adapted to direct corona discharge at the oil slick surface.

Finally, it should be appreciated that the inventive apparatus and process can be employed for separating any system of two liquids where one of the liquids floats on the other and the two liquids are immiscible and have different electrical conductivies. Thus, practically any organic substance immiscible with water can be removed from the surfaces of water bodies by the inventive process. In particular, oils such as animal oils, vegetable oils and mineral oils, as well as various liquid hydrocarbons for example, can be treated according to the present invention to cause them to readily separate from water. In addition, the inventive apparatus and process has wide applicability in the clean up of industrial waste.

While only a few embodiments of the present invention have been described above, it should be understood that many modifications can be made without departing from the spirit and scope of the invention. All reasonable modifications not specifically set forth are intended to be included within the scope of the present invention, which is to be limited only by the following claims.

What is claimed is:

1. A process for removing a non-emulsified, immiscible liquid hydrocarbon floating on the surface of a body of water in a thin, substantially continuous layer comprising positioning a corona generating electrical lead above said liquid hydrocarbon, applying sufficient electrical energy to said lead to generate a corona and subject said liquid hydrocarbon to the action of said corona, continuing the application of said electrical energy until said liquid hydrocarbon becomes electrically charged and increases in surface tension, and then removing said liquid hydrocarbon from said surface.

2. The process of claim 1 in which said liquid hydrocarbon is a mineral oil.

3. The process of claim 1 in which said liquid hydrocarbon is crude petroleum.

4. The process of claim 1 in which said electrical energy is applied until said liquid hydrocarbon comglomerates and becomes cohesive.

5. The process of claim 1 in which said corona is a positive corona.

6. The process of claim 1 in which said corona is a negative corona.

7. The process of claim 1 in which said liquid hydrocarbon is passed through a filter after being removed from said surface to discharge the electric charge on said liquid hydrocarbon.

* * * * *